United States Patent [19]

Giacone et al.

[11] Patent Number: 4,609,558

[45] Date of Patent: Sep. 2, 1986

[54] BREAD CRUMB-LIKE PRODUCT HAS ITS MANUFACTURE

[75] Inventors: Joseph Giacone, Princeton Junction; Casimiro P. Matias, Elizabeth, both of N.J.; Robert E. Altomare, Yonkers, N.Y.; Wei-Wen Mao, Dover, Del.

[73] Assignee: General Foods Corporation, White Plains, N.Y.

[21] Appl. No.: 737,308

[22] Filed: May 23, 1985

[51] Int. Cl.4 ............................................. A21D 13/00
[52] U.S. Cl. ..................................... 426/549; 426/19; 426/28
[58] Field of Search ............................ 426/549, 19, 28

[56] References Cited

U.S. PATENT DOCUMENTS 4,218,480  8/1980  Dyson et al. ................... 426/549 X
4,364,961 12/1982  Darley et al. .................. 426/549 X
4,440,793  4/1984  Seki ................................... 426/549

*Primary Examiner*—Joseph Golian
*Attorney, Agent, or Firm*—Sam D. Walker; Thomas R. Savoie; Daniel J. Donovan

[57] ABSTRACT

Farinaceous product particles having properties comparable to those of bread crumbs are produced by continuously mixing the individual components with a leavening agent in a continuous extruder/cooker, extruding the cooked dough, cutting the extruded dough into small lengths, grinding it while still moist and warm into small particles, heating the particles to simultaneously toast and dry same to a desired color, texture and moisture.

24 Claims, No Drawings

BREAD CRUMB-LIKE PRODUCT HAS ITS MANUFACTURE

FIELD OF INVENTION

The present invention discloses a process for preparing a farinaceous product with texture and appearance similar to bread crumbs.

BACKGROUND OF THE INVENTION

Bread crumbs have been generally produced by baking bread according to conventional yeast leavening procedures, allowing the bread to stale then comminuting the stale loaf to the desired particle size. The time required for staling is normally about 1 to 3 days, necessitating a large storage space for the loaves while staling occurs, and the rehandling of the same.

The use of gaseous materials such as carbon dioxide for leavening of bread has also been suggested. U.S. Pat. No. 3,041,176 by Baker, discloses the use of continuous mixers in combination with added gaseous materials. The introduction of gas as disclosed by Baker is used to raise the dough in subsequent baking to avoid the use of any yeast or ferment.

Because of the time required and the number of steps needed to make conventional bread crumbs, several attemps were made to streamline the process making it less time consuming and more economical. For instance, U.S. Pat. No. 4,364,961 by Darley et al. discloses a continuous process for manufacturing a bread crumb-like product wherein the farinaceous product-forming components are mixed in an extruder with carbon dioxide, or other gas or mixture of gases under critical conditions, to form a gas-leavened dough. The extruded dough is then comminuted to form discrete dough particles which are exposed to hot air to dry the surface of the particles and to stabilize the structure, and then dried to the desired moisture content. Also U.S. Pat. No. 4,218,480 by Dyson et al. discloses baking and expanding the gas-leavened dough to form a baked bread product which has the characteristic of a stale bread. The overall procedure in the above references requires only a short period of time, when compared to conventional baking processes and staling procedure.

U.S. Pat. No. 4,440,793 by Masao Seki discloses a method for producing bread crumbs comprising forming an essentially yeast free mixture obtained by adding 0.5-6.0% soy bean protein to wheat flour and mixing therein salt, fats, emulsifier, pH adjuster, coloring matter and flavoring material as secondary material, adding α-converted starch to the mixture, adding water thereto and thereafter heating and pressing the mixture by an extruder to extrude the mixture from a die into a rope-like configration. The rope-like material is drawn from the die of the extruder at a speed greater than the extrusion speed to produce bubbles in the rope-like materials. The material is then flattened, cut and crushed, and dried. The above reference produces a bread crumb-like product within 8 hours when compared to the conventional process which would have taken up to 36 hours.

None of the above cited references disclose a single continuous process to produce bread crumb-like pieces which simulate both the internal and external sections of a bread simultaneously. It is therefore an object of the present invention to significantly reduce the period of time required to efficiently produce bread crumbs.

Another object of the present invention is to produce a bread crumb-like piece simulating the internal portion of bread;

A further object of the present invention is to produce a bread crumb-like piece simulating the external portion of bread.

Still another object of the present invention is to develop a single continuous process for producing bread crumb-like pieces simulating both the internal and external portion of bread simultaneously.

SUMMARY OF THE INVENTION

The present invention is concerned with a process for preparing a farinaceous product with properties similar to bread crumbs comprising: feeding a farinaceous material including malted barley flour, together with an edible acid and baking powder into a cooker-extruder; adding sufficient water and mixing to form a dough; cooking the dough for a time and at a temperature and pressure effective to develop the gluten into a uniform structure and to substantially gelatinize the starch; extruding the cooked dough; tempering the dough to set the final structure and complete the cook; cutting the extruded dough into small lengths; grinding the dough while it is still moist, warm and pliable into discrete dough particles; and subjecting the moist dough particles to a distinct 2 zone simultaneous toasting and drying process to achieve a desired texture, color contrast and moisture level.

DETAILED DESCRIPTION

The present invention is concerned with a method for producing a bread crumb-like product which has similar texture, shape and taste to conventional fermented bread crumbs and has uses in a variety of food products such as fish coatings, chicken coatings, onion rings, meat patties, stuffing mixes, and as garnishes. The present invention provides a continuous cooking extrusion process which prepares a fully-cooked, extruded, toasted farinaceous product with the texture, aerated structure, appearance and taste similar to conventional fully-baked, flour-based bread crumbs or croutons.

The term "farinaceous material" is meant to include a grain material such as wheat, rice, oat, corn, peanut, etc.; flour; grits; full-fat, partially or wholly defatted grains, refined fraction of grain like gluten or starches, as well as lesser optional fractions of desirable non-grain materials such as whole or ground seeds, like sesame seed; beans, like whole defatted soy; seeds like sun flower; and/or other fractions such as protein isolate. In the present invention we are concerned with wheat flour, barley flour and flaky crust flour.

The first step of the present invention involves feeding a farinaceous material, including malted barley flour, an edible acid and a gas forming agent into a cooker extruder. The farinaceous material may also contain wheat flour and flaky crust flour. The malted barley flour acts as a texturizer and aid in the development of a stale bread-like flavor. The malted barley flour is present in amounts of up to 15% and preferably from 4 to 6% by weight of the farinaceous mixture.

An edible acid such as lactic acid is also added to the farinaceous material. The edible acids should be present in amounts sufficient to lower the pH of the farinaceous dough to that of conventional fermented dough. The edible acid is present in amounts up to 4% by weight and preferably between about 0.1% and about 2.0% of the farinaceous mixture. Suitable edible acid include, but are not limited to, lactic acid, phosphoric acid, hydrochloric acid, gluconic acid, acetic acid, succinic acid, adipic acid, fumaric acid, malic acid, tartaric acid, citric acid and mixtures thereof.

Gas is incorporated into the farinaceous mixture to obtain an aerated cell structure. Without the gas incorporation, an aerated cell structure will not be obtained, as the extrusion conditions used in this invention are milder than those employed in conventional cereal extrusion where steam puffing provides an aerated cell structure. Gas is incorporated into the dough by adding a gas forming agent to the dough which will release a gas during extrusion to develop the desired aerated cell structure. Preferred gas forming agents include sodium bicarbonate, ammonium bicarbonate, solid carbon dioxide as well as carbonates of other metals. These gas forming agents exclude the use of fermentable gas generators, such as yeast. Another embodiment involves injecting a gas such as carbon dioxide or nitrogen into the dough during the extrusion process. This results in an open spongy cell structure similar to that observed in a fully baked, yeast leavened, flour based product.

A major portion of the farinaceous material utilized in the present invention is wheat flour. The protein of wheat, namely gluten, possesses the peculiar and distinctive property of forming a visco elastic gel when wetted with water and worked for a period of time thereby making it suitable for the desired product of the present invention. The amount of wheat flour in the farinaceous material ranges from 55% to 90% by weight and preferably from 50% to 80% by weight of the farinaceous mixture.

Flaky crust flour, a refined wheat flour is used primarily in the baking industry for flaky pastry production. Flaky crust flour may also be present in the farinaceous material in amounts up to 30% by weight and preferably from 10% to 20% by weight of the farinaceous mixture.

Varying amounts of the dough-forming ingredients may also be added to the farinaceous material. Usually these ingredients include sugar in amounts up to about 14% by weight; milk substitute such as whey, soy isolates or soy protein blends in amounts up to about 5% by weight; salt in amounts up to about 5% by weight; shortening in amounts up to about 5% by weight; and emulsifiers in amounts up to about 6% by weight of the farinaceous mixture. The actual amounts of these ingredients will depend upon the desired characteristic of the final product.

Yeast and amylolytic or proteolytic enzymes may also be included to modify the texture and flavor of the product. Yeast is conventionally used for leavening purposes in bread-making. In the present invention yeast may be used in amounts up to about 1% by weight of the dough as a flavor enhancer rather than for leavening purposes which is accomplished in the present invention by the use of gaseous materials such as carbon dioxide, baking powder, nitrogen or the like and mixtures thereof.

The farinaceous materials are then mixed with the other dry ingredients. Blending in a ribbon blender or other type dry blending device is suitable for forming a uniform mixture of the dry materials.

A dough is then prepared by mixing the uniform mixture of dry materials with sufficient water suitable to provide an overall moisture content of the intermixed component of about 20 to 40% by weight and kneading same. This mixing and kneading process can be carried out in a first stage or section of the extruder which has temperatures below the cooking or gelatinization range of the ingredients. The mixing may also be carried out in a batch process or continuous dough mixer and then fed into the extruder.

Optionally, other ingredients such as bread crumb-type flavors, seasonings, particulate vegetable matter, meat, spices, fruit and fruit pieces, nuts, coloring agents and the like, may be incorporated into the dough matrix prior to extrusion.

The dough then passes into the cooking section of the extruder where it is extrusion-cooked for a time and at a temperature and pressure effective to develop the gluten into a uniform structure and substantially gelatinize the starch. The kneading action within the extruder transforms the dough mass into a continuous three dimensional network of hydrated protein fibers that enclose the starch granules and occluded gas which ultimately forms the cell walls of the cooked product.

The dough is subjected within the extruder to cooking temperatures within the ranges of 200° F. to 300+ F. and preferably from 225° F. to 275° F. These temperatures are critical to develop the gluten into a uniform structure and to substantially gelatinize the starch. At this temperature the dough is also subjected to pressure and medium to low shear mechanical work within the extruder for a period of time effective to set the protein into a uniform matrix and substantially gelatinize the starch. The effective period of time is dependent upon the variables: temperature, pressure, shear etc., but the mean will generally be within the range of 10 to 20 seconds.

During the extrusion-cooking, the head pressure of the extruder is generally within the range of 2.5 to 500 psig and preferably from 10 to 200 psig.

The shear conditions within the extruder are controlled to provide medium to low shear. This requires the use of a screw design within the extruder which will provide medium to low shear conditions. The work done on the dough within the extruder is about 15 to 50 watt hours per pound feed which is calculated by the amperage and voltage employed with the dough in the extruder less the amperage and voltage with water but without the dough in the extruder.

The dough within the extruder is heated using an external heat source to cause the setting up of the gluten and the gelatinization of the starch. The temperature within the extruder is maintained sufficiently high so that the heat applied when combined with the heat resulting from medium to low shear extrusion conditions result in the extrudate emerging from the extruder having a temperature in the range of 220° F. to about 290° F. and preferably from 240° F. to 275° F. The dough is extruded under a back pressure within the range of 2.5 psig to about 200 psig.

The extrudate contain trapped gaseous material which causes expansion of the cooked dough on exiting the extruder. Exit from the extruder is accomplished through a die containing an orifice through which the dough passes. The cross section of the orifice can be any geometric shape. The preferred orifice in the present invention is circular or rectangular. More preferably the dough is extruded through a 7/16 inch circular die.

The extruded dough is then allowed to temper in order to set the final structure and to complete the cook. Tempering causes a redistribution of the moisture within the rope, in that, the moisture moves from the center where the moisture content is very high to the low moisture area at the crust surface. The dough moisture content at extrusion ranges from about 18 to about 35% and preferably from about 20 to about 25%. The moisture loss and starch crystallization account for the formation of the crust of the extruded rope. The moisture migrates from the center to the crust of the rope wherein the rate of such migration will depend on the differences in vapor pressure, temperature and the diameter of the rope. At high temperature, moisture will move fairly rapidly from the interior to the exterior of the rope. However, as the rope crust begins to cool the rate of migration decreases. The total tempering time can be up to one hour.

The tempered dough is then cut into small lengths, ranging from ½ to about 12 inches. The moisture of the rope at cutting should range from about 17 to about 30% and preferably about 20% to 28%. The temperature of the dough at cutting ranges from 100° F. to 212° F. depending on the length of time the dough is tempered. The cut dough is then ground into a distribution of particles ranging from 0.5 inch to about a 0.0117 inches (50 mesh). This grinding is accomplished using a attrition type milling machine. At this point a large percentage of the moisture is lost due to the increase in exposed surface area. The product moisture at this point ranges from about 15% to about 19% preferably about 16.5 to 18.5%. The ground product is then conveyed into a toaster dryer.

The ground moist dough particles are then subjected to a 2 distinct zone, simultaneous static bed toasting/drying process to achieve the desired texture, moisture and color contrast. In the toasting/drying stage the ground extruded particles are transformed into a light, porous readily digestable and flavorful product. The changes involve in this conversion are complex and fundamental. The basic properties of starch and gluten are drastically altered. At the same time new substances such as carmelized sugars, pyrodextrins, melanoidins and a wide variety of carbonyl flavor substances are formed to endow the toasted crumb with its desirable organoleptic properties.

All these reactions play an important part in the transformation of the cooked dough into the final bread crumbs, and must occur in their proper sequence and under controlled conditions. The amount of heat supplied, the humidity within the toasting chamber, the bed depth of the particles and the duration of the toasting process are all factors that exert a fundamental influence on the general character of the final bread crumb.

The coarse ground dough particles having a moisture of about 18.5% travel on the mesh belt with a layer of crumb of about 1¼ to about 3 inches thickness through two distinct toasting/drying zones that vary in temperature and humidity conditions.

The residence time in the first zone is about 1 to 3 minutes and preferably about 1.5 minutes. The relative humidity generally ranges from 30 to about 70% and preferably about 40%. As the product passes through the first zone the product temperature increases between about 8° F. and 15° F. per minute, depending on the location of the product within the bed on the toaster/dryer belt. The temperature maintained within the first zone ranges from 250° F. to 400° F. and preferably from 350° F. to 375° F. depending on the depth of the crumb bed.

The residence time in the second zone is also 1 to 3 minutes and preferably about 1.5 minutes. The relative humidity generally ranges from about 20% to about 40% and preferably about 30%. The temperature maintained within the second zone ranges from about 200° F. to about 350° F. and preferably from 250° F. to 300+ F. Within the second zone most of the moisture is driven off and a final crumb structure, texture and color contrast is formed and set. The final crumb moisture exiting the toaster/dryer is in the range of 4% to 12% and preferably 4% to 6%. The toasted dired product is then cooled to a temperature of about 80° F. to about 100° F.

It is important in the present invention that during the toasting/drying operations the mesh belt is kept with a layer of crumb of about 1¼ to 3 inches thick. This is required in order to develop a toast color contrast to simulate conventional bread crumb mix.

The dried bread crumb-like product may be coated, dipped or sprayed with other ingredients (e.g. seasoning, fat, flavors, colors, etc.).

The following examples illustrate the prefered embodiment of the invention.

EXAMPLE I

A 495 LBS Dry mix blend containg the following ingredients was prepared:

| COMPONENT | PERCENTAGE |
|---|---|
| Bromated Wheat Flour | 61.3% |
| Flaky Crust Flour | 20.0% |
| Sugar | 6.5% |
| Malted Barley Flour | 4.1% |
| Milk Substitutes | 2.4% |
| Salt | 1.2% |
| Shortening | 0.8% |
| Lactic Acid (85%) | 0.5% |
| Glycerol monostearate | 0.2% |
| Mono and Diglyceride | 0.2% |
| Baking Powder | 2.8% |

The individual ingredients were blended in a ribbon blender for about 30 minutes using an average mixing speed.

The following is the order of addition of ingredients to the blender:
  Add all flours to the blender.
  Weight about 60% of the total sugar in formula and place in a Hobart bowl. Then weight the lactic acid and add slowly to the mixer containing the sugar and mix for 4 to 5 minutes.
  Weigh all other ingredients except shortening and add to a ribbon blender and mix for 2 to 3 minutes.
  Add the remaining sugar/and the sugar and lactic acid combination to the ribbon blender and mix for 2 to 3 minutes.
  Add the required shortening to the ribbon blender and mix gently for about 30 minutes.
  The thoroughly mixed ingredients were then fed into the extruder.

The blended dry mix was then fed to the inlets at one end of the continuous mixing zone of the extruder at a rate of 300 lbs/hr and water was simultaneously fed into the extruder at the rate of 57 lbs/hr (corresponding to a moisture content of about 25%). The dry mix and water were separately fed to the extruder within the mixing zone. The dry feed and water were continuously intermixed while conveyed from one end of the extruder/developer cooker zones to the other over a period of time of about 15 seconds to form a dough. The formed dough was then subjected to medium to low shear mechanical work within the kneading/developing/cooking zones sufficient to cause simultaneous uniform mixing of components and dispersion through the mixer. The work done on the dough within the mixing, developing and cooking zones was about 35 watt hr/lb feed of dough product. The dough was also heated using an external heating source which kept the extruder shell at about 250° F. The temperature within the extruder was maintained sufficiently high that the heat applied combined with that resulting from the medium to low shear mixing resulted in an expanded dough emerging from the extruder having a temperature of 273° F. The dough resulting from this operation in the extruder was extruded under a back pressure of 30 psig.

The dough was extruded through a 7/16 inch circular die which generated an expanded continuous rope of about 1 inch in diameter (25 mm). The density of the dough at this point was about 31 lbs/ft$^3$. The moisture content of the extruded dough was about 21%.

The extruded rope was then tempered at ambient conditions for 45 seconds and then cut into 2 inch pieces. The moisture at this point was about 20.6%.

The dough pieces were then ground to the desired particle size ½" to 0.0117" (50 mesh).

This was accomplished by using a Fitz-Mill machine with ½ inch screen. The product moisture at this point was about 18.7%. The wet crumb was then conveyed to be simultaneous dried and toasted on a static bed. The ground dough particles were then conveyed through two toasting/drying zones that vary in temperature and humidity conditions. The first zone residence time was about 1.5 minutes. The temperature on the first zone of the toaster was kept at 350° F. and the humidity was 32%. The second zone residence time is about 1.5 minutes and the temperature was kept at 300+ F. and the humidity 25%.

During the toasting/drying operations, the dryer mesh belt was kept with a layer of crumb having a thickness of 1½ inches.

The final crumb moisture exiting the toaster/dryer was about 4%.

EXAMPLE II

In this example, three separate feed streams were introduced to the extruder, a dry feed stream, a fermented yeast slurry and a water stream. The different feed compositions had the following constitutions:

| COMPONENT | PERCENTAGE |
|---|---|
| A. DRY FEED MIXTURE | |
| Wheat Flour | 60.91% |
| Flaky Crust Flour | 20.30% |
| Baking Powder | 2.84% |
| Malt Barley Flour | 4.06% |
| Sugar | 6.50% |
| Milk Substitute | 2.44% |
| Shortening | 0.8% |
| Salt | 1.21% |
| Glycerol Monostearate | 0.17% |
| Mono and Diglyceride | 0.17% |
| Lactic Acid (85%) | 0.6% |
| B. YEAST BREW SLURRY | |
| Wheat Flour | 15% |
| Active Dry Yeast | 5% |
| Sugar | 2% |
| Water | 78% |

The yeast brew was fermented for one hour at 100° F. The yeast brew was then cooled to 45° F. prior of being fed to the extruder.

The dry mix, yeast brew and the additional water were fed to one end of the extruder, the brew mixture was added with the water shortly downstream of the dry mix.

The feed rates for each individual stream were the following:

| Dry feed rate | 300 lbs/hr |
|---|---|
| Water | 21.3 lbs/hr |
| Yeast brew | 42.3 lbs/hr |

The extruder was operated as described in example one.

The dry feed, yeast brew and water were continuously intermixed while it was conveyed from one end of the extruder/developer/cooker zone to the other over a period of about 15 seconds. The mix was then subjected to mechanical work within the mixing/developing-/cooking zones. The work done on the dough within the mixing and developing and cooking zones was about 40 watt hr/lb feed of dough product. The temperature in the extruder was maintained sufficiently high so that the heat applied combined with the resulting work from the mixing resulted in a dough emerging from the extruder having a temperature of about 265° F. The dough was extruded under a back pressure of about 30 psig. The dough was extruded through a 7/16 inch circular die forming a continuous rope of about 1 inch in diameter. The resulting dough density at this point was about 30 lbs/ft.$^3$.

The dough rope was then tempered for 45 seconds at ambient conditions. The rope was then cut and ground into particles ranging in size from ½ inch to 50 mesh. The moisture at this point was about 19%. The wet crumb was then conveyed to a two zone conventional toaster/dryer.

The temperature of the first zone of the dryer/toaster was about 375° F., and the residence time was about 1.5 minutes. Also, the humidity of the first zone was 32%. The average temperature of the second zone was maintained at about 275° F. The residence time for this zone was also set for 1.5 minutes and the humidity 25%. The final crumb moisture leaving the toaster/dryer was about 5.5%. During the toasting/drying operation, the mesh belt of the toaster/dryer was kept with a layer of crumb having a thickness of 1½ inches.

What is claimed is:

1. A process for preparing a bread crumb mix with texture and appearance typifying the internal and external portions of a bread loaf from a single process comprising:
   (a) feeding a farinaceous material comprising wheat flour in amounts ranging from 55% to 90% by weight and containing wheat gluten; flaky crust flour in amounts of 10% to 30% by weight and malted barley flour in amounts of 4% to 15% by weight together with an edible acid and a gas forming agent other than fermentable gas generators into a cooker extruder, the acid present in amounts sufficient to lower the pH of a produced farinaceous dough to that of a conventional fermented dough and the gas producing in the final product an open spongy texture similar to that observed in a fully baked, yeast leavened, flour based product;
   (b) adding sufficient water to the extruder to increase the moisture of the farinaceous mixture to an amount ranging from about 20% to 40% by weight of the farinaceous mixture and mixing to form a dough;

(c) cooking the dough within the extruder for a time ranging from about 10 to about 20 seconds and at a temperature ranging from 200° F. to 300° F. and pressure ranging from 2.5 psig to 500 psig to develop the gluten into a uniform structure and substantially gelatinize the starch;

(d) extruding the cooked dough;

(e) tempering the cooked extruded dough to set the final structure and to complete the cook;

(f) cutting the dough into small lengths ranging from 0.5 to 12 inches;

(g) grinding the dough while it is still moist and warm into discrete dough particles; and (h) subjecting the most discrete dough particles to a distinct 2 zone simultaneous toasting/drying process wherein the humidity of the first zone ranges from 30 to 70%, the time within the first zone ranges from 1-3 minutes and the temperature within the first zone ranging from about 250° F. to about 400° F., and wherein the humidity within the second zone ranges from 20% to 40%, the time within the second zone ranges from 1-3 minutes and the temperature within the second zone ranges from about 200° F. to about 350° F. to achieve the desired texture, color contrast and moisture level.

2. A process according to claim 1 wherein the temperature of the product exiting the extruder ranges from 220° F. to about 290° F.

3. A process according to claim 2 wherein the temperature of the product exiting the extruder ranges from 240° F. to 275° F.

4. A process according to claim 1 wherein the dough is extruded through a 7/16th inch circular die.

5. A process according to claim 1 wherein the work done on the dough within the extruder ranges from 15 to 50 watt hours per pound feed.

6. a process according to claim 1 wherein the moisture of the dough at cutting ranges from 17% to about 30%.

7. A process according to claim 1 wherein the temperature of the dough at cutting ranges from 100° F. to 212° F.

8. A process according to claim 1 wherein the tempered cut dough is ground into particles having a distribution of sizes ranging from 0.5 inches to about 0.0117 inches.

9. A process according to claim 1 wherein the final crumb moisture exiting the toaster/dryer ranges from 2 to 12%.

10. A process according to claim 9 wherein the final crumb moisture exiting the toaster/dryer ranges from about 4% to 6%.

11. A process according to claim 1 wherein the coarse ground dough particles are toasted/dried on a mesh belt with layer of crumb of about 1¼ to about 3 inches thickness to develop a toast color contrast and texture simulating typical bread crumb mix.

12. A process according to claim 1 wherein the wheat flour ranges from 50% to 80% by weight.

13. A process according to claim 1 wherein the flaky crust flour ranges from 10% to 20% by weight.

14. A process according to claim 1 wherein the malted barley flour ranges from 4% to 6% by weight.

15. A process according to claim 1 wherein said farinaceous material further contains sugar in amounts up to 14% by weight; milk substitute in amounts up to 5% by weight; salt in amounts up to 5% by weight; shortening in amounts up to 5% by weight; and emulsifiers in amounts up to 6% by weight of the farinaceous mixture.

16. a process according to claim 1 wherein the temperature within the extruder ranges from 225° F. to about 275° F.

17. A process according to claim 1 wherein the pressure within the extruder ranges from 2.5 to 200 psig.

18. A process according to claim 1 wherein the edible acid is a member selected from a group consisting of lactic acid, phosphoric acid, hydrochloric acid, gluconic acid, acetic acid, succinic acid, adipic acid, fumaric acid, malic acid, tartaric acid, citric acid and mixtures thereof.

19. A process according to claim 18 wherein the edible acid is lactic acid.

20. a process according to claim 1 wherein the edible acid is present in amounts up to 4% by weight of the farinaceous mixture.

21. A process according to claim 20 wherein the edible acid is present in amounts ranging from 0.1% to 2.0% of the farinaceous mixture.

22. A process according to claim 1 wherein the gas forming agent is a member selected from a group consisting of sodium bicarbonate, ammonium bicarbonate, solid carbon dioxide and carbonates of other metals and mixtures thereof.

23. A process according to claim 22 wherein the gas forming agent is sodium bicarbonate.

24. a process according to claim 1 further comprises the addition of yeast in amounts up to about 1% to the farinaceous mixture as a flavor enhancer.

* * * * *